J. B. DRAKE.
Saw-Sharpening Devices.
No. 143,067. Patented September 23, 1873.
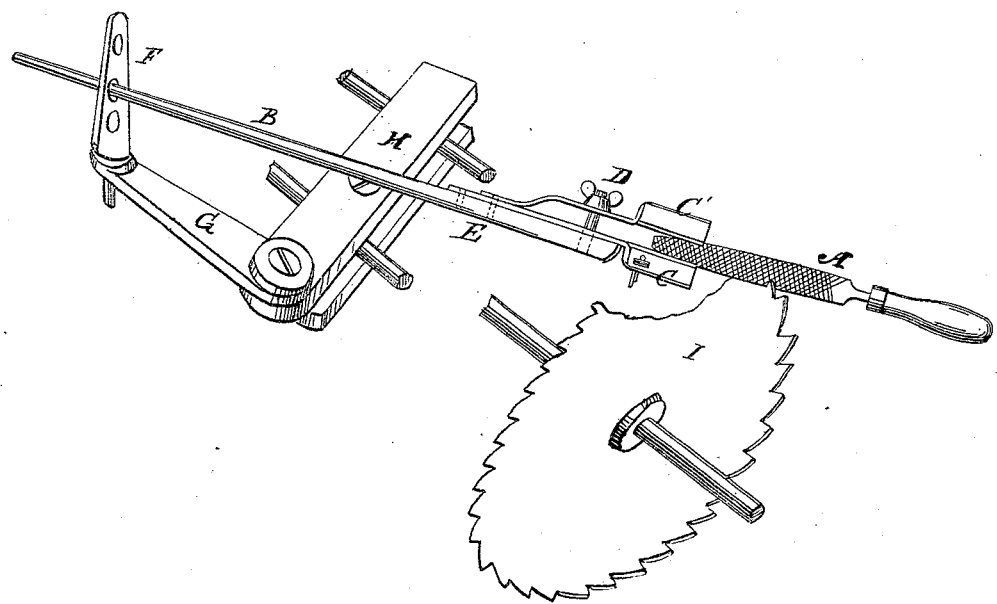
Witnesses:
Inventor:
J. B. Drake
Per
Attorneys.

UNITED STATES PATENT OFFICE.

JOHN B. DRAKE, OF GOSHEN, INDIANA.

IMPROVEMENT IN SAW-SHARPENING DEVICES.

Specification forming part of Letters Patent No. 143,067, dated September 23, 1873; application filed March 22, 1873.

*To all whom it may concern:*

Be it known that I, JOHN B. DRAKE, of Goshen, in the county of Elkhart and State of Indiana, have invented a new and useful Improvement in Guide for Filing Saw-Mill Saw, of which the following is a specification:

To enable a saw-mill saw to do good work—that is, to run straight and cut smooth lumber—it is necessary that all the teeth should have the same bevel and pitch, or be exactly uniform one with another. To insure such a condition of the saw is the object of this invention; and it consists in an apparatus for holding the file and file-guide, the construction and arrangement of parts being as hereinafter described.

The accompanying drawing illustrates my invention.

Similar letters of reference indicate corresponding parts.

A is the file. B is the file-guide. C C' represent jaws on the file-guide for holding the file. The upper jaw C' is attached to a spring, and both jaws are grooved to receive the edges of the file, as seen in the drawing. D is the fastening-screw. The jaws are attached to the guide by means of bolts, as indicated in dotted lines at E. The file-guide is a rod which extends back, and passes through an adjustable guide, F, by means of which the file-guide is adjusted as to height as may be necessary. This guide F is supported by the arm G, which is attached by a bolt to the clamps H. These clamps are fastened to any fixture convenient, or they can be bolted or fastened in any manner suitable for the purpose. I is a circular saw to which the file is applied, which is turned upon its arbor as the teeth are filed.

This apparatus is applicable to vertical saws as well as to circular saws. By means of it the file is carried in a straight line across the saw.

The operator does not give the file the rocking motion so common to the unguided file, and he is compelled to always hold it at the same bevel, thus making the teeth uniform, and leaving the saw in proper condition for business.

Having thus described my invention, I claim as new and desire to secure by Letters Patent—

The file-guide B, having, at one end, jaws C C, to hold the file, and rounded at the other, to slide in a hole, combined with a guide, F, that is adjustable laterally with the frame G H, as and for the purpose described.

JOHN B. DRAKE.

Witnesses:
JOHN MCAULEY,
JOHN F. SIELLEMAN.